United States Patent
Banas et al.

(10) Patent No.: US 12,424,051 B2
(45) Date of Patent: *Sep. 23, 2025

(54) GAMING SYSTEMS AND METHODS FOR EMOTIVE LIGHTING CONTROL

(71) Applicant: LNW Gaming, Inc., Las Vegas, NV (US)

(72) Inventors: Nicholas E. Banas, Henderson, NV (US); Vito Michael Caporusso, Downers Grove, IL (US); Benjamin E. Isaac, Las Vegas, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,625

(22) Filed: Nov. 3, 2023

(65) Prior Publication Data

US 2024/0062613 A1 Feb. 22, 2024

Related U.S. Application Data

(63) Continuation of application No. 17/124,713, filed on Dec. 17, 2020, now Pat. No. 11,842,598.

(60) Provisional application No. 62/951,334, filed on Dec. 20, 2019.

(51) Int. Cl.
| | |
|---|---|
| *A63F 9/24* | (2006.01) |
| *A63F 11/00* | (2006.01) |
| *G06F 13/00* | (2006.01) |
| *G06F 17/00* | (2019.01) |
| *G07F 17/32* | (2006.01) |
| *G09G 5/10* | (2006.01) |

(52) U.S. Cl.
CPC .......... *G07F 17/3211* (2013.01); *G09G 5/10* (2013.01); *G09G 2320/0626* (2013.01)

(58) Field of Classification Search
CPC ... G07F 17/32; G07F 17/3213; G07F 17/3214
USPC .............................. 463/1, 13, 20, 22, 31, 39
See application file for complete search history.

(56) References Cited

U.S. PATENT DOCUMENTS

| | | |
|---|---|---|
| 7,811,170 B2 | 10/2010 | Winans et al. |
| 7,864,204 B2 | 1/2011 | Overes |
| 8,749,538 B2 | 6/2014 | Webster et al. |
| 9,547,952 B2 | 1/2017 | Brunell et al. |
| 10,997,820 B2 | 5/2021 | Acres et al. |
| 2004/0166932 A1 | 8/2004 | Lam et al. |
| 2007/0165406 A1 | 7/2007 | Wang |
| 2009/0017903 A1 | 1/2009 | Mizoguchi et al. |

(Continued)

*Primary Examiner* — Adetokunbo O Torimiro

(57) ABSTRACT

A gaming machine includes a cabinet, a display device, a lighting assembly including at least one light-emitting device, game-logic circuitry that conducts one or more casino wagering games and generates graphical data, and a display controller communicatively coupled to the display device and the lighting assembly. The graphical data includes display data and lighting data as pixel values. The display controller causes the display device to present display content associated with the one or more casino wagering games. The display controller receives the graphical data from the game-logic circuitry, extracts the lighting data and the display data from the graphical data, converts the lighting data from pixel values to lighting control parameters accepted by the lighting assembly, causes the display device to present the display content based on the display data, and causes the lighting assembly to emit light based on the lighting control parameters of the lighting data.

20 Claims, 6 Drawing Sheets

(56) References Cited

U.S. PATENT DOCUMENTS

| | | |
|---|---|---|
| 2010/0188443 A1 | 7/2010 | Lewis et al. |
| 2011/0070949 A1 | 3/2011 | Prins et al. |
| 2012/0098960 A1 | 4/2012 | Fujino et al. |
| 2018/0352626 A1 | 12/2018 | Komanduri et al. |
| 2021/0295638 A1 | 9/2021 | Urban et al. |

GAMING SYSTEMS AND METHODS FOR EMOTIVE LIGHTING CONTROL

CROSS-REFERENCE TO RELATED APPLICATIONS

This application is a continuation of U.S. patent application Ser. No. 17/124,713, filed Dec. 17, 2020, which claims the benefit of priority to U.S. Provisional Application No. 62/951,334, filed Dec. 20, 2019, both the contents of which are hereby incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2020, SG Gaming, Inc.

FIELD

The present disclosure relates generally to gaming systems, apparatus, and methods and, more particularly, to emotive lighting systems for gaming machines.

BACKGROUND

Gaming machines employ a variety of components and elements to attract and maintain player attention. For example, many gaming machines include one or more lighting assemblies that emit light. These lighting assemblies may accent images displayed on one or more display devices of the gaming machine or otherwise provide an additional visual attraction to entice potential players to participate in a wagering game at the gaming machine. The lighting assemblies may be programmed to emit light at different wavelengths (i.e., different colors), brightness, speeds, etc. to provide dynamic lighting to the gaming machine.

At least some known gaming machines include a dedicated lighting controller that is communicatively coupled to each of the lighting assemblies of the gaming machines. The lighting controller may be separate from the game-logic circuitry that manages the wagering game. The lighting controller may receive control inputs from the game-logic circuitry that cause the lighting controller to operate the lighting assemblies according to the control inputs.

However, such lighting systems with a dedicated lighting controller may cause issues and/or inefficiencies for the gaming machine and the software implemented by the gaming machine. For example, a separate lighting controller draws additional power, which can be costly when considered in combination with the other various components of the gaming machine that draw power and the gaming environment in which gaming machines are typically deployed. That is, such gaming environments may include a plurality of gaming machines within a relatively small area. Additional power draw may increase the cost of maintaining the gaming machines and/or may cause additional strain to the underlying power network to which the gaming machines are electrically coupled. The lighting controller may also cause electromagnetic interference (EMI) with other nearby electronic components. Moreover, the lighting controller may cause complexities in programming for the wagering games. That is, the lighting controller may be configured to execute instructions according to a specific scripting or programming protocol that is different from the protocol(s) used for developing the wagering games. As a result, developing synchronous lighting cycles and displayed game elements may be unintuitive, thereby potentially resulting in increased development time and/or unintended lighting cycles.

Accordingly, improvements to lighting systems within a gaming machine are desired.

SUMMARY

According to one aspect of the present disclosure, gaming machine includes a cabinet, a display device, a lighting assembly including at least one light-emitting device, game-logic circuitry that conducts one or more casino wagering games and generates graphical data, and a display controller communicatively coupled to the display device and the lighting assembly. The graphical data includes display data and lighting data as pixel values. The display controller causes the display device to present display content associated with the one or more casino wagering games. The display controller receives the graphical data from the game-logic circuitry, extracts the lighting data and the display data from the graphical data, converts the lighting data from pixel values to lighting control parameters accepted by the lighting assembly, causes the display device to present the display content based on the display data, and causes the lighting assembly to emit light based on the lighting control parameters of the lighting data.

According to another aspect of the disclosure, a method for controlling lighting of a gaming machine within a gaming system is provided. The gaming machine includes a cabinet, a display device each coupled to the cabinet, a lighting assembly coupled to the cabinet and including at least one light-emitting device, and a display controller communicatively coupled to the display device and the lighting assembly. The method includes conducting, via game-logic circuitry of the gaming system, one or more casino wagering games, presenting, via the display device controlled by the display controller, display content associated with the one or more casino wagering games, generating, via the game-logic circuitry, graphical data associated with the one or more casino wagering games, the graphical data being generated as pixel values and including display data and lighting data, receiving, by the display controller, the graphical data from the game-logic circuitry, extracting, by the display controller, the lighting data and the display data from the graphical data, converting, by the display controller, the lighting data from pixel values to lighting control parameters accepted by the lighting assembly, and causing, by the display controller, (i) the display device to present the display content based on the display data and (ii) the lighting assembly to emit light based on the lighting control parameters of the lighting data.

According to yet another aspect of the disclosure, a gaming system includes game-logic circuitry and a gaming machine. The game-logic circuitry conducts one or more casino wagering games and generates graphical data as pixel values, the graphical data including display data and lighting data. The gaming machine includes a cabinet, a display device coupled to the cabinet, a lighting assembly coupled to the cabinet, the lighting assembly comprising at least one light-emitting device, and a display controller communicatively coupled to the display device and the lighting assembly. The display controller causes the display device to present display content associated with one or more casino wagering games. The display controller receives the graphical data from the game-logic circuitry, extracts the lighting data and the display data from the graphical data, converts the lighting data from pixel values to lighting control parameters accepted by the lighting assembly, causes the display device to present the display content based on the display data, and causes the lighting assembly to emit light based on the lighting control parameters of the lighting data. The gaming system may be incorporated into a single, freestanding gaming machine.

Additional aspects of the disclosure will be apparent to those of ordinary skill in the art in view of the detailed description of various embodiments, which is made with reference to the drawings, a brief description of which is provided below.

Figure 1:
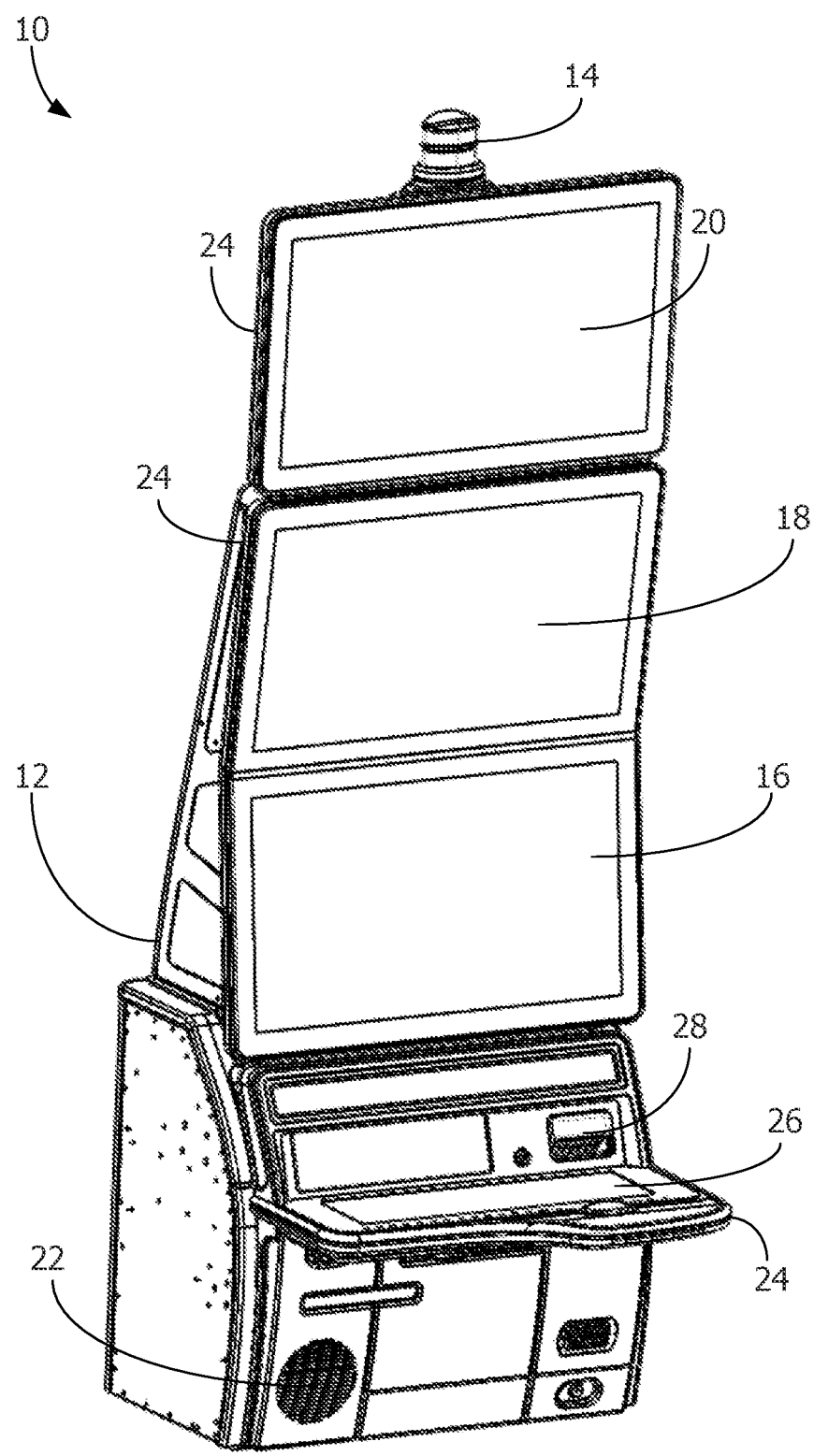
FIG. 1 is a perspective view of a free-standing gaming machine according to one or more embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

At least some of the data described herein are described having a relative location within a data package. It is to be understood that such description is not intended to limit the data described herein to a particular format and configuration, but rather is intended to illustrate potential relations between different types or forms of data. For example, data matrices and/or array may be divided into a plurality of cells that each have a relative location in relation to other cells, but the underlying data storage may not include the same relationship. A matrix of pixel values may be stored a continuous series of data addresses or another suitable format, such as a plurality of linked arrays.

The systems and methods described herein incorporate a lighting control process that may reduce the complexity and/or resource draw (e.g., power draw) for generating emotive lighting on and/or around a gaming machine. More specifically, the systems and methods described herein include lighting assemblies that are communicatively coupled to a display controller of one or more displays rather than a lighting controller. The display controller is configured to receive a graphical data containing both data for the displays and data for the lighting assemblies. The display controller is configured to extract the data for the lighting assemblies from the graphical data and convert the data into a data format recognized by the lighting assemblies. The converted data is then transmitted to the lighting assemblies for one or more light-emitting devices to emit light based on the converted data. In addition to removing the need for a separate lighting controller, which may reduce the power draw of the gaming machine and may reduce the EMI within the gaming machine, the systems and methods described herein may facilitate a reduced complexity in development of the presentation of the gaming machine and its associated game. That is, rather than coordinating lighting control in a scripting language recognized by a lighting controller with the elements displayed on the display devices of the gaming machine, the systems and methods described herein enable the lighting control and display to be coordinated together within the graphical data.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. A notification mechanism 14, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 16, a secondary display 18, a topper display 20, and one or more audio speakers 22. The primary display 16, the secondary display 18, and/or the topper display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The displays 16, 18, and 20 may include a touchscreen for accepting player input. In the example embodiment, the gaming machine 10 includes a plurality of lighting assemblies 24 that emit emotive lighting according to a lighting scheme. The lighting assemblies 24 may be associated with one or more displays as described herein to synchronize the emotive lighting with the display content presented by the displays.

The gaming machine 10 may include a touchscreen button panel 26, a bill/ticket acceptor 28, a card reader/writer, a ticket dispenser, and/or player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the button panel 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, a card reader/writer, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, a card reader/writer, a ticket dispenser for printing tickets redeemable for cash or credits, a wireless communication interface for transmitting cash or credit data to a nearby mobile device, and a network interface for depositing cash or credits to a remote account via an electronic funds transfer.

Figure 2:
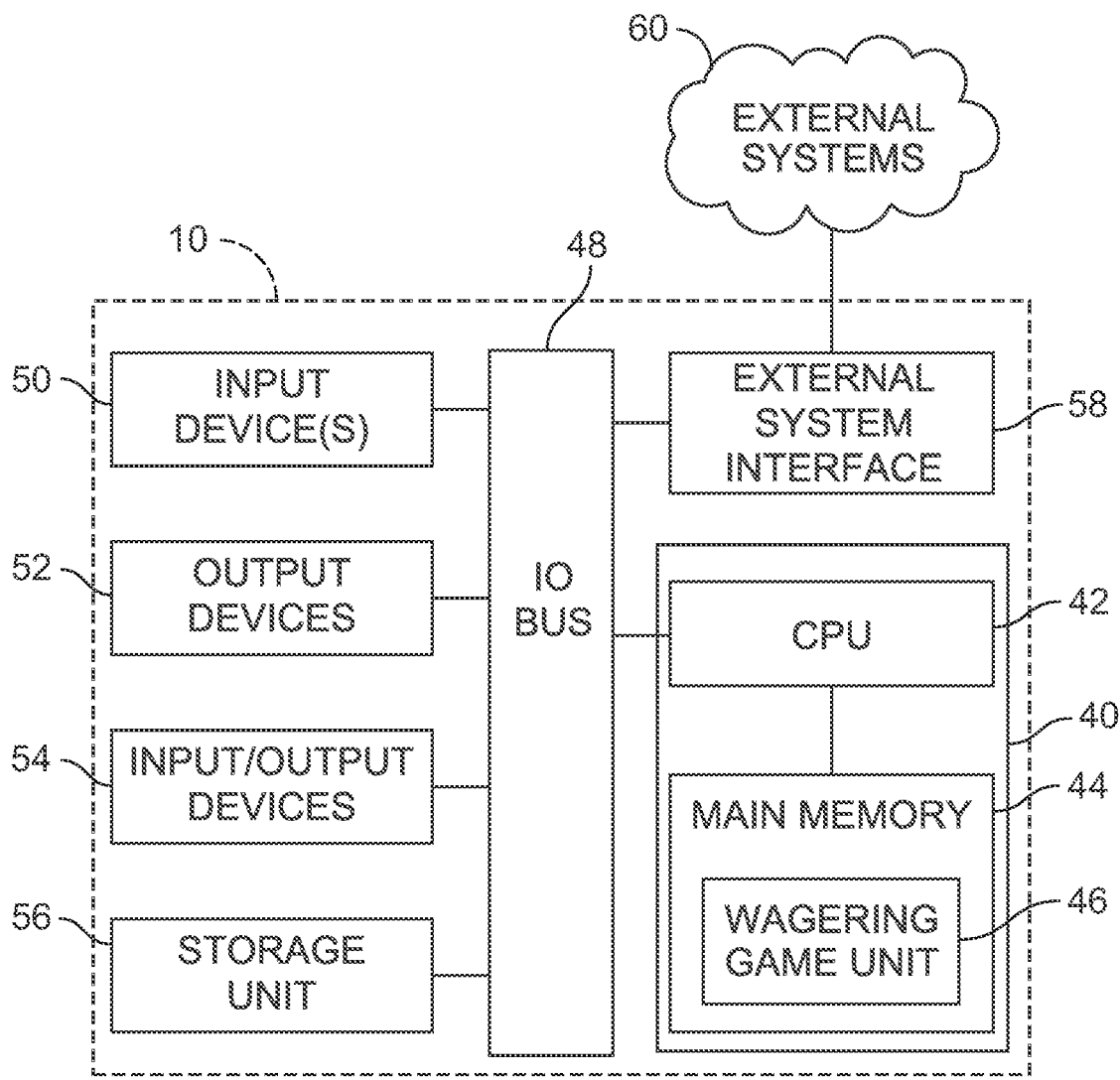
FIG. 2 is a schematic view of a gaming system according to one or more embodiments of the present disclosure.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)— all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
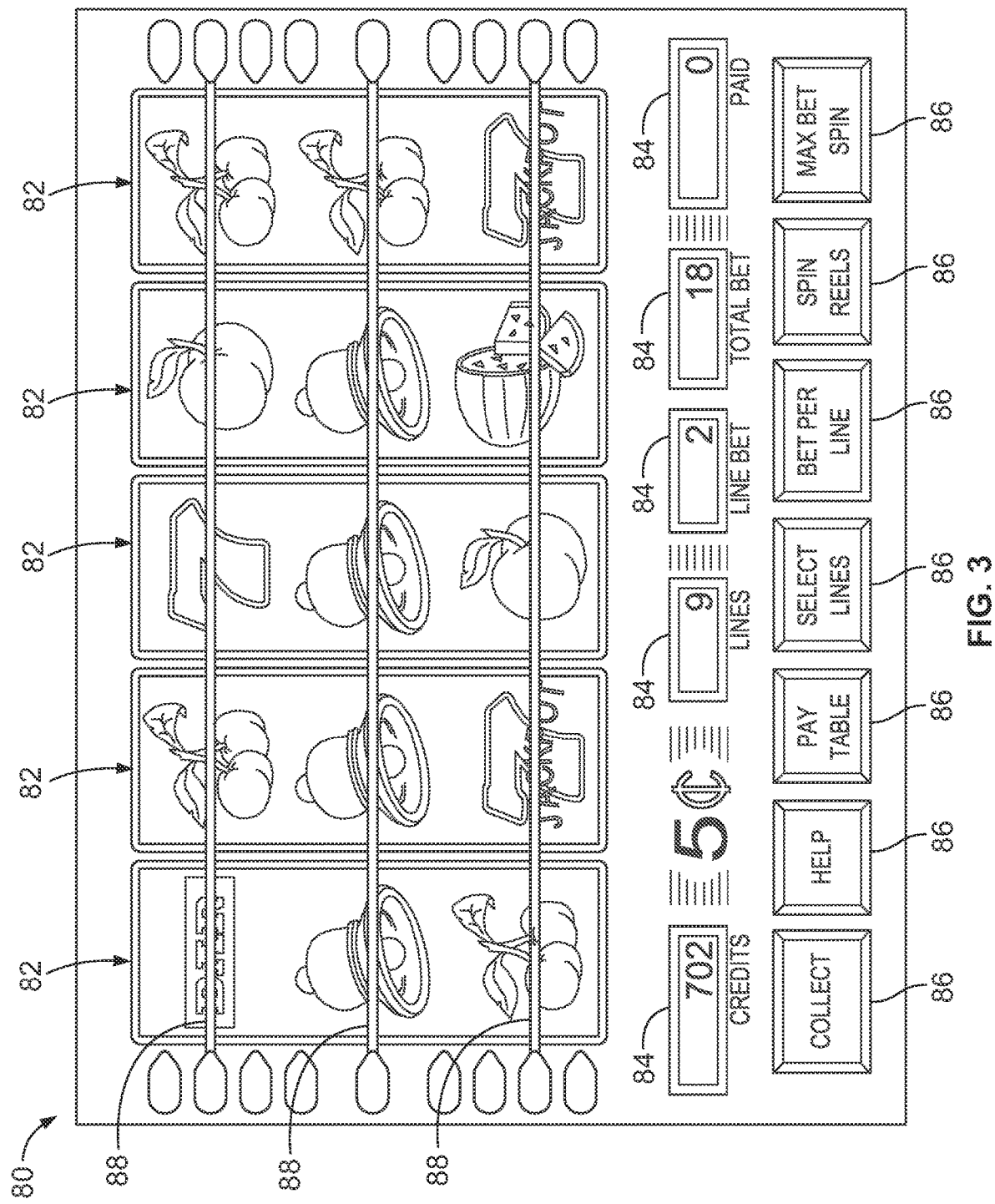
FIG. 3 is an image of an exemplary basic-game screen of a wagering game displayed on a gaming machine, according to one or more embodiments of the present disclosure.

Referring now to FIG. 3, there is illustrated an image of a basic-game screen 80 adapted to be displayed on the primary display 16 or the secondary display 18. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the button panel 26 shown in FIG. 1. The game-logic circuitry 40 operates to execute a wagering-game program causing the primary display 16 or the secondary display 18 to display the wagering game.

In response to receiving an input indicative of a wager covered by or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 16 or secondary display 18) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, affected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

The systems and methods described herein are related to emotive lighting control for gaming machines. For example, the logic circuitry 40 (shown in FIG. 2) of gaming machine 10 may be configured to generate lighting data as graphical data for a display controller to extract and deliver to one or more lighting assemblies. This configuration enables the gaming machine 10 to control the lighting assemblies in coordination with graphics presented by the one or more displays of the gaming machine 10 without the need of a dedicated lighting controller.

Figure 4:
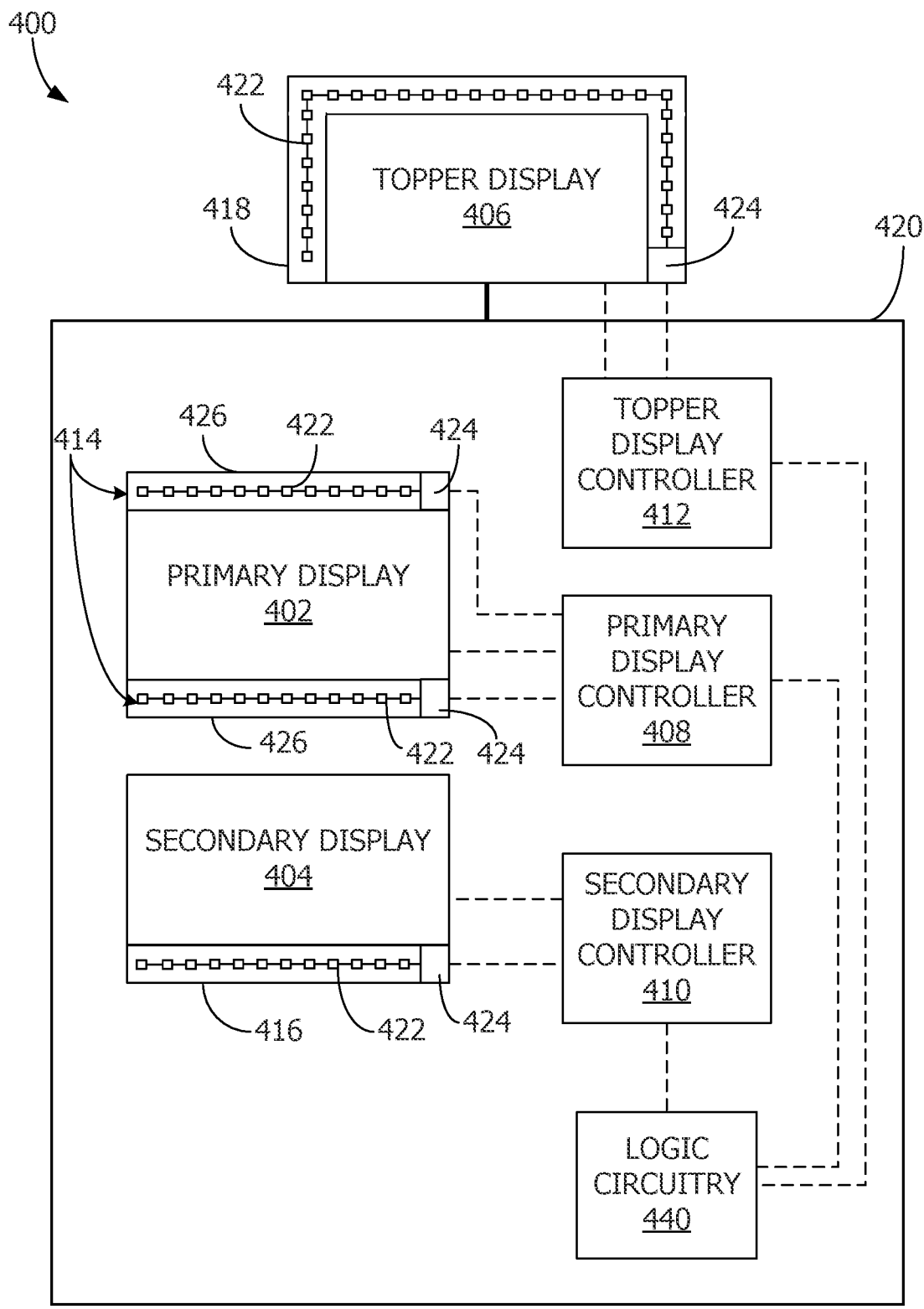
FIG. 4 is a data flow diagram of an exemplary gaming system with an emotive lighting system according to one or more embodiments of the present disclosure.

FIG. 4 is a block diagram of an example gaming machine 400 according to at least some of aspects of this disclosure. The gaming machine 400 may be substantially similar to the gaming machine 10 (shown in FIG. 1). In the example embodiment, the gaming machine 400 includes a primary display 402, a secondary display 404, a topper display 406, a primary display controller 408, a secondary display controller 410, a topper display controller 412, a primary lighting assembly 414, a secondary lighting assembly 416, a topper lighting assembly 418, a cabinet 420, and logic circuitry 440. In other embodiments, the gaming machine 400 includes additional, fewer, or alternative components, including those described elsewhere herein, in a similar or different configuration. In one example, the gaming machine 400 may include additional or fewer displays (e.g., the topper may include a physical graphic instead of a topper display 406).

The primary display 402, the secondary display 404, and the topper display 406 are coupled to the cabinet 420. In other embodiments, one or more of the displays 402, 404, and/or 406 may not be physically coupled to the cabinet, but rather are located near the gaming machine 400. The displays 402, 404, and 406 may be any suitable type of display, such as, and without limitation, liquid crystal displays (LCDs) organic light-emitting diode (OLED) displays, plasma displays, cathode ray tube (CRT) displays, and the like. The logic circuitry 440 is communicatively coupled to each of the primary display 402, the secondary display 404, and the topper display 406 to enable the logic circuitry 440 to control the output of the displays. That is, the logic circuitry 440 is configured to generate images or graphics for display on the primary display 402, the secondary display 404, and the topper display 406. IN other embodiments, a different device may be configured to generate images for display on at least one of the primary display 402, the secondary display 404, and/or the topper display 406.

The primary display 402 is configured to present or display at least graphics related to one or more casino games (e.g., the game interface shown in FIG. 3). Other graphics that may be of interest to a player at the gaming machine 400 may also be displayed by the primary display 402. The secondary display 404 may be configured to present graphics the same or similar to the primary display. That is, in some embodiments, the secondary display 404 presents casino games in tandem with the primary display 402. In other embodiments, the secondary display 404 may present information or controls that are supplemental to the presentation on the primary display 402. For example, the secondary display may be incorporated within a control panel of the gaming machine 400. The topper display 406 may be configured to present graphical attractions and/or notifications for both the player and bystanders. For example, the topper display 406 may present graphics to entice potential players to come to the gaming machine 400 as well as graphics indicating that the player has attained a winning outcome or big prize in the casino wagering game. In certain embodiments, gameplay may also be presented on the topper display 406. For example, some games may include community or bonus games that incorporate the use of the topper display 406.

The primary display controller 408, the secondary display controller 410, and the topper display controller 412 are communicatively coupled to the primary display 402, the secondary display 404, and the topper display 406, respectively. The display controllers 408, 410, and 412 may be physically integrated within a display package with the respective displays 402, 404, and 406 to be affixed to the cabinet 420. The display controllers 408, 410, and 412 are configured to receive data from the logic circuitry 440 and cause the displays 402, 404, and 406 to present display content based on the received data. In some embodiments, the data from the logic circuitry 440 is in a format recognized by the displays 402, 404, and 406, and the display controllers 408, 410, and 412 transmit the data directly to the displays 402, 404, and 406. In other embodiments, the data from the logic circuitry 440 is converted by the display controllers 408, 410, and 412 into a format accepted by the displays 402, 404, and 406. Although the gaming machine 400 is shown to include one display controller for each display, it is to be understood that a different configuration may be used. For example, one display controller may be communicatively coupled to a plurality displays.

In the example embodiment, the primary display controller 408, the secondary display controller 410, and the topper display controller 412 are also communicatively coupled to the primary lighting assembly 414, the secondary lighting assembly 416, and the topper lighting assembly 418, respectively. The lighting assemblies 414, 416, and 418 are configured to emit light according to one or more control values. In particular, the emitted light may be configured to supplement or complement the graphics presented by the associated display 402, 404, or 406. In at least some embodiments, the lighting assemblies 414, 416, and 418 are coupled to the cabinet proximate to the associated display 402, 404, or 406. In certain embodiments, the lighting assemblies 414, 416, and/or 418 may be integrated with the respective displays 402, 404, and/or 406.

The lighting assemblies 414, 416, and 418 each include at least one light-emitting device 422 communicatively coupled to at least one lighting driver 424. The light-emitting device 422 may be any suitable device for emitting controllable light, such as, and without limitation, light-emitting diodes (LEDs), florescent lights, incandescent lights, and halogen lights. That is, adjusting power and/or other control inputs to the light-emitting device 422 may selectively turn on or off and/or cause the emitted light to change in intensity and/or color. The lighting driver 424 is configured to provide such inputs to the light-emitting device 422. In some embodiments, the lighting driver 424 is an interface at which other suitable devices (e.g., the display controllers 408, 410, and 412) can selectively apply power and/or control inputs to the light-emitting devices. In other embodiments, the lighting driver 424 may be configured to receive control commands from a controlling device and operate the light-emitting devices 422 according to the control commands. It is to be understood that other suitable configurations of the lighting driver 424 may be used. For example, the lighting driver may not be positioned in-line with the light-emitting devices 422, but rather is positioned beneath the light-emitting devices 422 (e.g., on a surface of a circuit board opposite the surface of the circuit board on which the light-emitting devices 422 are coupled to). In another embodiment, the lighting driver 424 may be distributed within and/or external to the lighting assembly.

The lighting assemblies 414, 416, and 418 may be continuous assemblies (i.e., all components are coupled together within a single physical package) or a plurality of subassemblies. In the example embodiment, the primary lighting assembly 414 includes two lighting subassemblies 426 while the secondary lighting assembly 416 and the topper lighting assembly 418 each include a single continuous assembly. The lighting subassemblies 426 are positioned adjacent to the top and bottom edges of the primary display 402. Each lighting subassembly includes at least one light-emitting device 422 and a lighting driver 424. The configuration of the lighting subassemblies with respect to each other and/or the primary display 402 may be automatically detected by the primary display controller 408 and/or manually defined such that the primary display controller 408 may transmit lighting control parameters as described herein to the correct subassembly 426. In other embodiments, other suitable configurations of the lighting assemblies may be used for the gaming machine 400. In one example, a single lighting assembly may be used for both the primary display 402 and the secondary display 404. In another example, the secondary lighting assembly 416 and/or the topper lighting assembly 418 may be divided into lighting subassemblies. In yet another example, the primary lighting assembly may be divided into four lighting subassemblies surrounding the borders of the primary display 402.

To control the lighting assemblies 414, 416, and 418, the display controllers 408, 410, and 412 are configured to transmit lighting control parameters to the lighting drivers 424. The lighting control parameters are data structured in a format recognized by the lighting drivers 424 (or at least the light-emitting devices 422) that control the light emission by the light-emitting devices. That is, the lighting control parameters may include, but are not limited to, a power signal, a control signal (e.g., to control any transistors within the light-emitting devices 422), timing data, duty cycle data, color data, and/or intensity data. The lighting control parameters may be digital data, analog data, or combinations thereof. The lighting control parameters, either directly or indirectly (i.e., the lighting driver 424 controls the light-emitting device 422 based on the control parameters), cause the light-emitting device 422 to selectively change or maintain different characteristics of the light emission. For example, the lighting control parameters may cause the light-emitting device 422 to emit light at different wavelengths (i.e., different colors), amplitudes, duty cycles, and/or phases, thereby facilitating control of the appearance of the emitted light. The light-emitting devices 422 within a particular lighting assembly may be uniquely addressable or addressable as subsets. That is, lighting control parameters can be specific to a particular light-emitting device 422 or subset of light-emitting devices 422 to enable different lighting control parameters to be delivered at once, which may be used to create various emotive lighting effects and patterns (e.g., stripes, breathing effects, wave effects, etc.).

In the example embodiment, the lighting control parameters are transmitted to the respective display controller from the logic circuitry 440. More specifically, the logic circuitry 440 is configured to transmit the lighting control parameters as lighting data in combination with display data for presentation by one or more associated displays as graphical data. The graphical data may be generated as pixel values. As used herein, a "pixel value" refers to data or a set of data related to the visual appearance of a pixel or subsection of an image. For example, the pixel value may indicate the color, brightness, and/or other suitable characteristics of a pixel. The data of the pixel values may be digital, analog, or combinations thereof. In certain embodiments, particularly for video content, the pixel values may include additional data, such as, but not limited to, metadata or data indicating the duration to maintain the visual appearance of a particular pixel. It is to be understood that although the term "pixel" is used to herein for the example embodiment, other subsections of an image may be used in other embodiments (and, by extension, "subsection values" other than pixel values may be used).

Although the pixel values of the lighting data in the graphical data and the lighting control parameters are similar in their high-level function (i.e., causing a device to generate a visible presentation according to specified parameters), the format and type of data may be different such that a lighting assembly is unlikely to be configured to process a pixel value correctly. For example, the pixel value may be a hexadecimal value according to a predefined color palate, whereas the lighting control parameters may indicate the duty cycle of a particular light-emitting device. As a result, in the example embodiment, the display controllers are configured to parse the pixel values of the lighting data from the graphical data, convert the pixel values to a format accepted by the lighting driver (i.e., the lighting control parameters), and transmit both the converted lighting control parameters to the respective lighting driver and the display data to the associated display.

Figure 5:
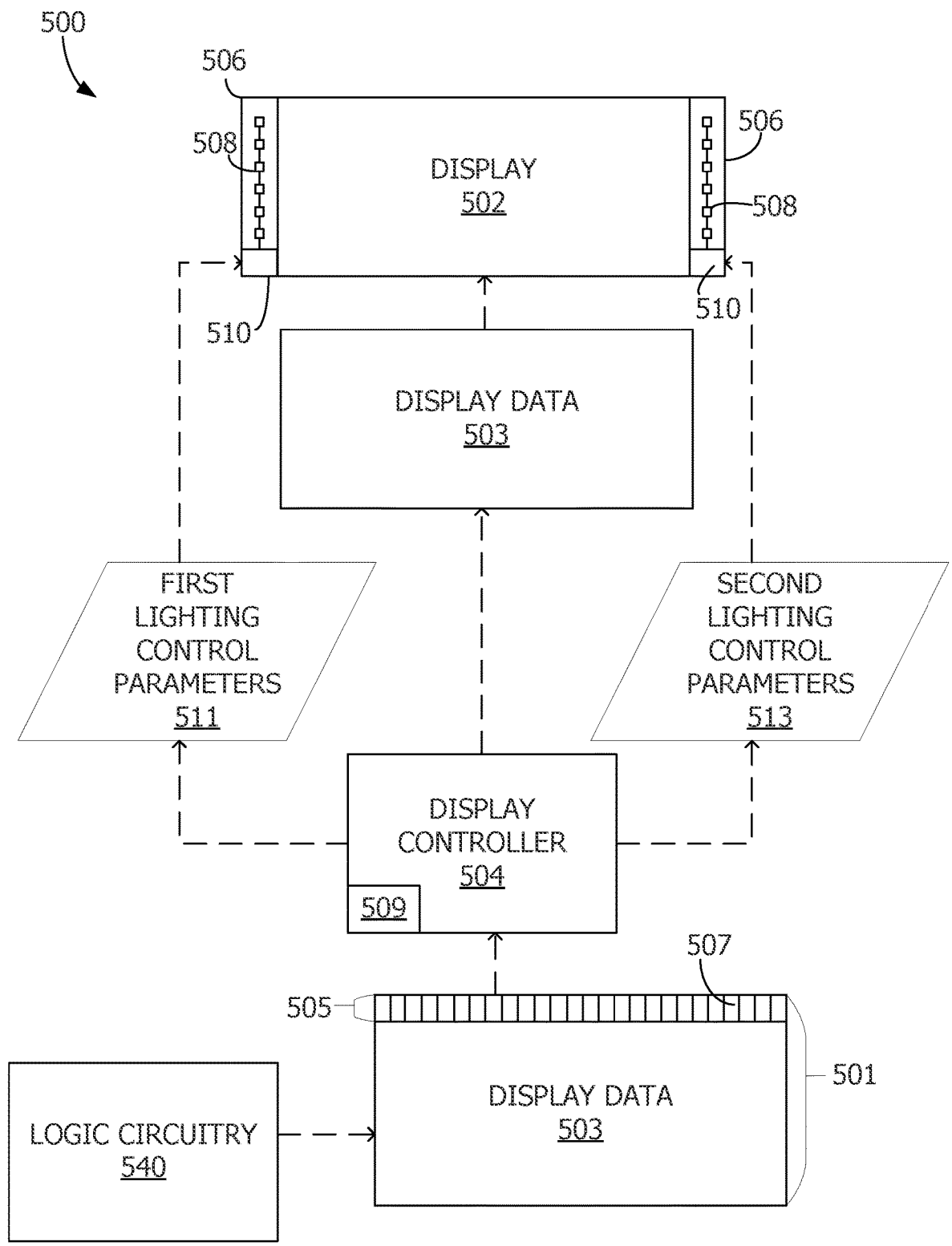
FIG. 5 is a data flow diagram of an exemplary display controller of a gaming machine extracting lighting data and display data from graphical data.

FIG. 5 is a data flow diagram of an example process for extracting lighting control parameters from graphical data using an example gaming system 500. The system 500 includes a display 502, a display controller 504, a lighting assembly 506, and logic circuitry 540. The components of the system 500 may be substantially similar to the components described within the gaming machines 10 and 400 (shown in FIGS. 1 and 4, respectively). Other components may be included within the system 500 (including a gaming machine that houses each component described herein), but are not shown in FIG. 5 to focus on the example process described herein. In other embodiments, the system 500 may include additional, fewer, or alternative components in one or more configurations, including those described herein. For example, similar to the gaming machine 400 shown in FIG. 4, the process may be performed using a plurality of displays, display controllers, and/or lighting assemblies.

In the example embodiment, the logic circuitry 540 is configured to generate graphical data to be presented on the display 502 and the lighting assembly 506. In one example, the logic circuitry 540 is configured to conduct one or more casino games, which includes generating graphics related to the presentation of the casino games (e.g., the reels shown in FIG. 3). The graphics are generated as a series of images that, when presented as a continuous stream, form a video stream. The graphical elements included within the video stream may by dynamic dependent on one or more variables, such as, and without limitation, user input, credit input, messages from networked devices, and/or internal functions (e.g., a random-number generation).

In the example embodiment, the logic circuitry 540 generates graphical data 501 as matrix of pixel values. The graphical data 501 includes both display data 503 for the display 502 and lighting data 505 for the lighting assembly 506. Although the graphical data is depicted with pixel values 507 of the lighting data 505 as a top row of the graphical data 501, other configurations of the display data 503 and the lighting data 505 may be used, including configurations in which the pixel values 507 of the lighting data 505 are distributed around the display data 503 within the matrix forming the graphical data 501. The pixel values of the display data 503 are not shown in FIG. 5 to visually distinguish the display data 503 from the lighting data 505. In at least some embodiments, the graphical data 501 may include additional data (e.g., data for monitoring the operation of the display 502) and/or be included within a larger greater data package. In one example, audio data may be transmitted with the graphical data 501.

The display 502 is configured to present display content, such as gameplay, video content, and the like, based on the display data 503. In one example, each pixel value of the display data 503 corresponds to a pixel or group of pixels on the display 502, and a hexadecimal color value of the pixel value is used by the display controller 504 to cause the display 502 to present the indicated color at the corresponding pixel or pixels on the display 502. The display controller 504 may be configured to convert and/or transmit the display data 502 in a configuration accepted by the display 502. For example, the display data 503 may be separated and distributed along predefined paths between the display controller 504 and the display 502 for each pixel of the display 502.

The display data 503 may be configured in a pixel resolution that matches an aspect ratio of the pixels of the display 502. That is, the number of horizontal pixel values to the number of vertical pixel values of the display data 503 matches the ratio of horizontal pixels to vertical pixels of the display 502. The actual pixel resolution of the display data 503 may be greater than, less than, or equal to the pixel resolution of the display 502. In instances where the display data 503 has a different pixel resolution, the display controller 504 may be configured to scale the display data 503 to match the pixel resolution of the display 502. In one example, the aspect ratio of the display 502 and the display data 503 is 16:9. In other embodiments, the graphical data 501 may be configured to match the aspect ratio and/or pixel resolution of the display 502 such that the display data 503 does not match to all of the pixels of the display 502. For example, the lighting data 505 may be stored as a row or column adjacent the display data 503 (e.g., in FIG. 5, the lighting data 505 is stored as the top row of the graphical data 501). After the lighting data 505 is extracted, the displayed content on the display 502 based on the display data 503 may include a blank or black row or column of pixels at the pixel locations that were previously occupied by the lighting data 505. Due to the relatively high density and small size of pixels on modern displays, a row or column of black pixels at the boundary of displayed content may be nearly imperceptible to players. In certain embodiments, the display controller 504 may be configured to add additional pixel values to the display data 503 in response to extracting the lighting data 505. For example, the display controller 504 may be configured to detect the color value of adjacent pixel values or border pixel values and populate the display data 503 accordingly to match the aspect ratio of the display 502.

The lighting data 505 is generated by the logic circuitry 540 to be delivered as pixel values 507 for the display controller 504. In the example embodiment, the various light schemes and display content for a casino game may be developed in tandem using a similar or the same development environment. That is, in comparison to previous development processes in which lighting schemes are developed as a series of scripts for a dedicated lighting controller, the development of the lighting schemes in conjunction with the development of the display content (and any underlying aspects of the casino game) using the system 500 may facilitate reduced complexity of the development process. That is, developing the lighting schemes using pixel values may be easier for a developer to visualize and construct.

The lighting data 505 generated by the logic circuitry 540 may be stored in memory as a series of lighting schemes. A lighting scheme may be as simple as a single color to be displayed by the lighting assembly 506 or as complex as an animated, multi-color presentation across one or more lighting subassemblies. The lighting data 505 may be generated according to a predefined schedule, a state of the system 500 (e.g., an attraction state to attract new players), and/or in response to one or more trigger conditions, such as a winning outcome be achieved. The lighting schemes may be predefined such that generating the lighting data 505 may include retrieving the corresponding data for a lighting scheme from memory. In certain embodiments, the lighting schemes may be variable such that one or more parameters (e.g., colors, speed, brightness, etc.) may be changed by the logic circuitry 540.

Each pixel value 507 of the lighting data 505 may correspond to one or more light-emitting devices 508 of the lighting assembly 506. These associations between the pixel values 507 and the light-emitting devices 508 may be predefined to enable the logic circuitry 540 to map the predefined lighting scheme to the correct pixel values 507. Some pixel values 507 may not be assigned a color, but rather are generated as a 'NULL', black, or off value. In certain embodiments, some pixel values 507 may not be used by the display controller 504 and the lighting assembly 506. For example, the lighting data 505 may be divided into a plurality of subsections of pixel values 507 that are associated with a particular lighting subassembly (e.g., top subassembly, right subassembly, etc.). The display controller 504 may be configured to manually or automatically identify which, if any, lighting subassemblies are presented and associated with the display 502. In one example, each gaming machine may be associated with a particular machine identifier that enables the display controller 504 and/or the logic circuitry 540 to retrieve predefined lighting assembly information from a database of gaming machines. If the lighting data 505 includes pixel values 507 for a lighting subassembly not presently associated with the display 502, these pixel values 507 may be ignored. In certain embodiments, the logic circuitry 540 may generate NULL, blank, or black pixel values 507 for absent lighting subassemblies. The pixel values 507 may be associated with different lighting subassemblies for different machine identifiers.

Similar to the display data 503, which may be generated and stored by the logic circuitry 540 within a video buffer to facilitate transmitting a stream of graphical data 501, the lighting data 505 may be generated and stored in a lighting buffer within the memory of the logic circuitry 540. In other embodiments, the display data 503 and the lighting data 505 are stored together as the graphical data 501 in a graphical buffer from which subsequent graphical data 501 is transmitted as a stream of data to the display controller 504.

The display controller 504 is configured to receive the graphical data 501 and extract the display data 503 and the lighting data 505. In the example embodiment, the display data 503 is in a format recognized by the display 502. The display controller 504 may then transmit the display data 503 to the display 502. The display 502 is configured to present display content (e.g., game interfaces, video content, etc.) based on the display data 503. The display 502 then is configured to receive subsequent display data 503 (as part of subsequent graphical data 501) and update the presented content based on the subsequent display data 503. In other embodiments, the display controller 504 is configured to generate data for the display 502 based on the display data 503.

In the example embodiment, the display controller 504 is configured to convert the lighting data 505 into a data format recognized by the lighting drivers 510. For example, if the pixel values 507 are in a hexadecimal color code format (e.g., xFFFF), the display controller 504 is configured to convert the color code to a power signal of a particular duty cycle that, when received by the light-emitting device 508, causes the light-emitting device 508 to emit light of a color matching or substantially similar to the color identified by the hexadecimal color code. In the example embodiment, the display controller 504 references a lighting conversion map 509 to convert the lighting data 505. The lighting conversion map 509 may be a stored list of relationships between pixel values 507 and lighting parameters that are associated with the same or substantially similar color, brightness, and/or other suitable characteristic of emitted light. In other embodiments, the lighting conversion map 509 may be one or more algorithms that accepts pixel values 507 as inputs and outputs lighting parameters as at least partially a function of the input pixel values 507. The lighting conversion map 509 may be stored locally by the display controller 504 or remotely. In embodiments in which the conversion map 509 is stored remotely, the display controller 504 may query a database and/or computing device storing the conversion map 509 using the pixel values 507 to receive the lighting parameters. In some embodiments, the lighting data 505 may include a series of lighting control parameters for the lighting assembly 506. That is, the bandwidth of lighting data 505 is sufficient to deliver multiple packets of lighting control parameters that can be transmitted to the lighting assembly 506 as a series of parameters, thereby enabling the lighting assembly 506 to present a lighting scheme having increased granularity in control relative to the display 502.

In the example embodiment, the lighting assembly 506 is divided into two subassemblies that are positioned adjacent the left and right edges of the display 502. The display controller 504 is configured to convert the lighting data into lighting control parameters accepted by the lighting assembly 506 and transmit the lighting control parameters to the respective light-emitting devices (directly or indirectly via the lighting drivers 510). The depicted lighting assembly has two subassemblies with respective lighting drivers 510, and therefore the lighting control parameters are transmitted separately as first lighting control parameters 511 and second lighting control parameters 513 to the respective subassemblies. The lighting control parameters 511, 513 include control parameters for each light-emitting device 508. It is to be understood that at least some light-emitting devices 508 may not have explicit lighting control parameters, which may be used to cause the light-emitting devices 508 to turn off (i.e., emit no visible light) or continue emitting light according to previous lighting control parameters. In at least some embodiments, the lighting control parameters 511, 513 may not be transmitted to the lighting assembly 506 as two data packages, but rather is transmitted a single data package or as a plurality of data packages. For example, the display controller 504 may be configured to communicate with each of the addressable light-emitting devices 508 (or the addressable group of light-emitting devices 508) within the lighting assembly 506 separately.

The lighting assembly 506 is configured to present a lighting scheme based on the lighting control parameters 511, 513 substantially synchronous to the display 502 presenting display content based on the display data 503 to provide a unified presentation by the gaming system 500. Subsequent graphical data 501 is then generated by the logic circuitry 540 and transmitted to the display controller 504. The display controller 504 converts and/or routes the subsequent display data 503 and lighting control parameters 511, 513 to the display 502 and the lighting assembly 506, respectively, to update the presented display content and/or lighting scheme. In certain embodiments, the display 502, the display controller 504, and/or the lighting assembly 506 may include memory that stores a buffer of graphical data 501, display data 503, and/or lighting control parameters 511, 513. For example, the display controller 504 may store a video buffer of display data 503 extracted from a plurality of graphical data packages and a lighting buffer of control parameters generated from lighting data extracted from the graphical data packages.

Figure 6:
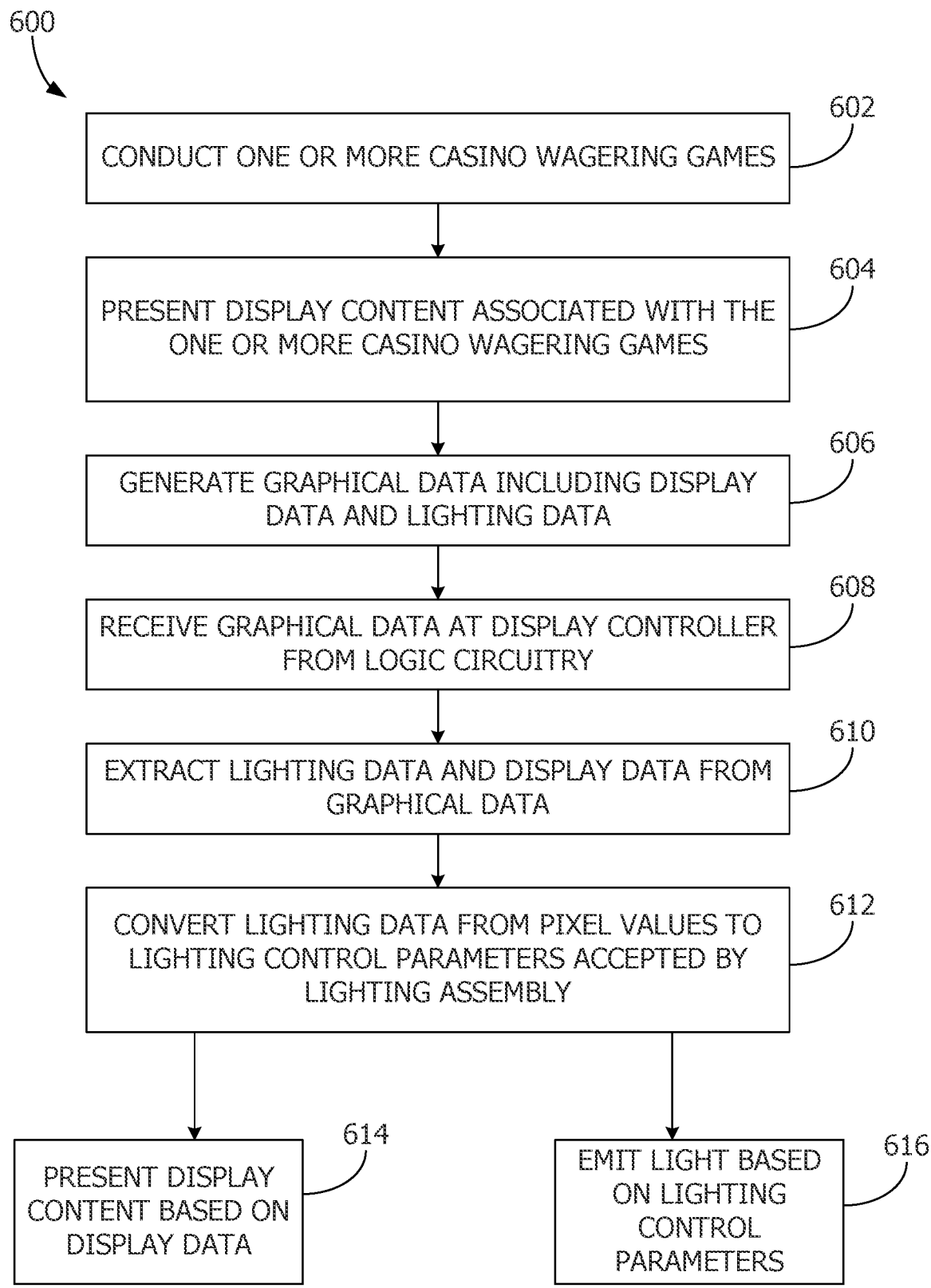
FIG. 6 is a flow diagram of an exemplary method for controlling an emotive lighting system of a gaming machine according to one or more embodiments of the present disclosure.

FIG. 6 is a flow diagram of an example method 600 for controlling lighting of a gaming machine within a gaming system, such as the gaming system 500 show in FIG. 5. The method 600 may be at least partially performed using the logic circuitry 540 and/or the display controller 504 in combination with one or more displays (e.g., the display 502) and one or more lighting assemblies (e.g., the lighting assembly 506). Other suitable devices may be used to perform at least some of the functionality associated with the method 600 described herein. The method 600 is described with respect to the system 500, but it is to be understood that the method 600 may be scaled to apply to systems have a different number of displays, display controllers, and/or lighting assemblies. For example, the method 600 may be performed using the gaming machine 400 shown in FIG. 4. In other embodiments, the method 600 may include additional, fewer, or alternative steps, including those described elsewhere herein.

In the example embodiment, the logic circuitry 540 conducts 602 one or more casino games at an associated gaming machine. The gaming machine may include at least a portion of the logic circuitry 540 or be in communication with the logic circuitry 540. To conduct the casino games, the logic circuitry 540 causes the display 502 to present 604 display content associated with the casino games, such as an gaming interface similar to FIG. 3.

In the example embodiment, to present unified display content and lighting scheme, the logic circuitry 540 generates 606 graphical data 501 including display data 503 and lighting data 505 as pixel values. The graphical data 501 may represent a single "frame" (i.e., a discrete image and/or other visual content that, when presented in a series of frames, forms video or animated content) for presentation by the display 502 and the lighting assembly 506. In certain embodiments, the rate at which the logic circuitry 540 may generate the graphical data 501 may be synchronized to a refresh rate of the display 502 (e.g., 60 Hz, 120 Hz, etc.). The logic circuitry 540 then transmits the graphical data 501 to the display controller 504 for processing.

The display controller 504 receives 608 the graphical data 501 and extracts 610 the display data 503 and the lighting data 505 from the received graphical data 501. In at least some embodiments, the format and data size of the graphical data 501 is predefined such that the extraction 610 is performed without additional analysis of the graphical data 501. In other embodiments, the graphical data 501 may be variable in its format and/or data size, and the display controller 504 is configured to analyze the graphical data 501 to extract 610 the display data 503 and the lighting data 505. For example, the lighting data 505 may have a variable data length. The lighting data 505 may include a data signature that, when detected by the display controller 504 indicates the boundary between the lighting data 505 and the display data 503. In another example, the display controller 504 may identify the lighting data 505 based on the predefined size of the display data 503 and the relative location of the lighting data 505 to the display data 503 (e.g., the lighting data 505 is stored ahead of or behind the display data 503).

In the example embodiment, the display controller 504 then converts 612 the lighting data 505 from pixel values 507 to lighting control parameters 511, 513 that are accepted by the lighting control assembly 506. In at least some embodiments, the display controller 504 references a lighting conversion map 509 (or another suitable device storing the lighting conversion map 509) to execute the conversion 612. The display controller 504 then causes the display 502 to present 614 display content (e.g., the display content associated with the one or more casino games) based on the extracted display data 503 and causes the lighting assembly 506 to emit 616 light according to a lighting scheme based on the lighting control parameters 511, 513. In some embodiments, the display controller 504 transmits the display data 503 directly to the display 502 to cause the display 502 to display 614 the display content. In other embodiments, the display controller 504 may convert the display data 503 to a format recognized by the display 502. The lighting control parameters 511, 513 may be transmitted to the light-emitting devices 508 directly or to the lighting driver 510. In embodiments in which the lighting driver 510 receives the lighting control parameters 511, 513, the lighting driver 510 may divide and distribute the parameters to the respective light-emitting devices 508. Alternatively, if the lighting driver 510 supplies power and/or control signals to the light-emitting devices 508, the lighting drive 510 may adjust the power signals and/or the control signals according to the lighting control parameters 511, 513. The method 600 may then be repeated to generate 606 subsequent graphical data 501.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

The invention claimed is:

1. A gaming machine comprising:
   a cabinet;
   a display device coupled to the cabinet;
   a lighting assembly coupled to the cabinet, the lighting assembly comprising at least one light-emitting device;
   game-logic circuitry configured to conduct one or more casino wagering games and generate graphical data including lighting data, the graphical data being generated as pixel values; and
   a display controller communicatively coupled to the display device and the lighting assembly, the display controller configured to cause the display device to present display content associated with the one or more casino wagering games, the display controller configured to:
      receive the graphical data from the game-logic circuitry;
      extract the lighting data from the graphical data;
      convert the lighting data from pixel values to lighting control parameters accepted by the lighting assembly by comparing the pixel values of the lighting data to a lighting conversion map indicating predefined relationships between lighting control parameters and pixel values; and
      cause the lighting assembly to emit light based on the lighting control parameters of the lighting data.

2. The gaming machine of claim 1, wherein each pixel value of the lighting data corresponds to a color value of the lighting conversion map.

3. The gaming machine of claim 1, wherein the graphical data includes display data associated with the display device, the display device configured to present the display content based on the display data.

4. The gaming machine of claim 3, wherein the lighting control data extracted from the graphical data is separate from the display data.

5. The gaming machine of claim 1, wherein each of the at least one light-emitting device is associated with one or more pixel values of the lighting control data.

6. The gaming machine of claim 1, wherein the gaming machine includes a plurality of display devices, a plurality of lighting assemblies, and a plurality of display controllers, each display controller of the plurality of display controllers associated with a respective display device of the plurality of display devices and a respective lighting assembly of the plurality of lighting assemblies.

7. The gaming machine of claim 1, wherein the lighting assembly includes at least one lighting driver configured to selectively control the at least one light-emitting device based on the lighting control parameters of the lighting data.

8. A method for controlling lighting of a gaming machine within a gaming system, the gaming machine including a cabinet, a display device each coupled to the cabinet, a lighting assembly coupled to the cabinet and including at least one light-emitting device, and a display controller communicatively coupled to the display device and the lighting assembly, the method comprising:
   conducting, via game-logic circuitry of the gaming system, one or more casino wagering games;
   presenting, via the display device controlled by the display controller, display content associated with the one or more casino wagering games;
   generating, via the game-logic circuitry, graphical data associated with the one or more casino wagering games and including lighting data, the graphical data being generated as pixel values;
   receiving, by the display controller, the graphical data from the game-logic circuitry;
   extracting, by the display controller, the lighting data from the graphical data;
   converting, by the display controller, the lighting data from pixel values to lighting control parameters accepted by the lighting assembly by comparing the pixel values of the lighting data to a lighting conversion map indicating predefined relationships between lighting control parameters and pixel values; and
   causing, by the display controller, the lighting assembly to emit light based on the lighting control parameters of the lighting data.

9. The method of claim 8, wherein each pixel value of the lighting data corresponds to a color value of the lighting conversion map.

10. The method of claim 8, wherein the graphical data includes display data associated with the display device, the display device configured to present the display content based on the display data.

11. The method of claim 10, wherein the lighting control data extracted from the graphical data is separate from the display data.

12. The method of claim 8, wherein each of the at least one light-emitting device is associated with one or more pixel values of the lighting control data.

13. The method of claim 8, wherein the gaming machine includes a plurality of display devices, a plurality of lighting assemblies, and a plurality of display controllers, each display controller of the plurality of display controllers associated with a respective display device of the plurality of display devices and a respective lighting assembly of the plurality of lighting assemblies.

14. The method of claim 8, wherein the lighting assembly includes at least one lighting driver configured to selectively control the at least one light-emitting device based on the lighting control parameters of the lighting data.

15. A gaming system comprising:
   game-logic circuitry configured to conduct one or more casino wagering games and generate graphical data including lighting data, the graphical data being generated as pixel values; and
   a gaming machine comprising:
      a cabinet;
      a display device coupled to the cabinet;
      a lighting assembly coupled to the cabinet, the lighting assembly comprising at least one light-emitting device; and
      a display controller communicatively coupled to the display device and the lighting assembly, the display controller configured to cause the display device to present display content associated with one or more casino wagering games, the display controller configured to:
         receive the graphical data from the game-logic circuitry;
         extract the lighting data from the graphical data;
         convert the lighting data from pixel values to lighting control parameters accepted by the lighting assembly by comparing the pixel values of the lighting data to a lighting conversion map indicating predefined relationships between lighting control parameters and pixel values; and
cause the lighting assembly to emit light based on the lighting control parameters of the lighting data.

16. The gaming system of claim 15, wherein each pixel value of the lighting data corresponds to a color value of the lighting conversion map.

17. The gaming system of claim 15, wherein the graphical data includes display data associated with the display device, the display device configured to present the display content based on the display data.

18. The gaming system of claim 17, wherein the lighting control data extracted from the graphical data is separate from the display data.

19. The gaming system of claim 15, wherein each of the at least one light-emitting device is associated with one or more pixel values of the lighting control data.

20. The gaming system of claim 15, wherein the gaming machine includes a plurality of display devices, a plurality of lighting assemblies, and a plurality of display controllers, each display controller of the plurality of display controllers associated with a respective display device of the plurality of display devices and a respective lighting assembly of the plurality of lighting assemblies.

* * * * *